(12) United States Patent
Horita et al.

(10) Patent No.: US 8,723,486 B2
(45) Date of Patent: May 13, 2014

(54) DEVICE FOR CONTROLLING POWER GENERATION OF ON-VEHICLE POWER GENERATOR

(75) Inventors: Yousuke Horita, Kariya (JP); Takahiko Tashiro, Kariya (JP)

(73) Assignee: Denso Corporation, Kariya (JP)

( * ) Notice: Subject to any disclaimer, the term of this patent is extended or adjusted under 35 U.S.C. 154(b) by 389 days.

(21) Appl. No.: 13/295,604

(22) Filed: Nov. 14, 2011

(65) Prior Publication Data

US 2012/0119713 A1    May 17, 2012

(30) Foreign Application Priority Data

Nov. 12, 2010    (JP) ................................. 2010-253605

(51) Int. Cl.
   *H02P 11/00*    (2006.01)
(52) U.S. Cl.
   USPC .............................................. 322/28; 322/36
(58) Field of Classification Search
   USPC ........................................ 322/27, 28, 36, 37
   See application file for complete search history.

(56) References Cited

U.S. PATENT DOCUMENTS

| 5,629,606 | A | * | 5/1997 | Asada ............................. 322/28 |
| 5,767,636 | A | * | 6/1998 | Kanazawa et al. ............ 318/139 |
| 5,880,577 | A |   | 3/1999 | Aoyama et al. |
| 7,292,007 | B2 | * | 11/2007 | Aoyama ........................... 322/24 |
| 7,304,455 | B2 | * | 12/2007 | Okahara et al. ................. 322/28 |
| 8,076,790 | B2 | * | 12/2011 | Ichinose et al. ................. 290/44 |
| 2002/0050810 | A1 |  | 5/2002 | Taniguchi et al. |

FOREIGN PATENT DOCUMENTS

| JP | A-61-171879 | 8/1986 |
| JP | A-7-194022 | 7/1995 |
| JP | A-9-009695 | 1/1997 |
| JP | B2-4006941 | 11/2007 |

OTHER PUBLICATIONS

Oct. 17, 2012 Office Action issued in Japanese Patent Application No. 2010-253605 (with translation).

* cited by examiner

*Primary Examiner* — Nicholas Ponomarenko
(74) *Attorney, Agent, or Firm* — Oliff PLC

(57) ABSTRACT

A device for controlling an on-vehicle power generator is provided with switching means, detecting means, voltage control means, startup control means and normal state control means. The voltage control means controls the output voltage of the power generator together with the switching means. The detecting means detects state of the power generation including a startup state where the engine is in startup condition and a normal state where normal power generation has been performed. The startup control means controls the voltage control means to start/stop of the power generation based on the frequency of the phase voltage of the power generator in the startup state. The normal state control means controls the voltage control means in the normal state such that the normal state control means controls the voltage control means to continue the power generation or stops the power generation based on the frequency of the phase voltage.

4 Claims, 4 Drawing Sheets

DEVICE FOR CONTROLLING POWER GENERATION OF ON-VEHICLE POWER GENERATOR

CROSS REFERENCE TO RELATED APPLICATION

This application is based on and claims the benefit of priority from earlier Japanese Patent Application No. 2010-253605 filed Nov. 12, 2010, the description of which is incorporated herein by reference.

BACKGROUND OF THE INVENTION

1. Field of the Invention

The present invention relates to a control device mounted on a vehicle, and more particularly to a control device for controlling power generation of a power generator mounted on a vehicle such as a car and a truck.

2. Description of the Related Art

Conventionally, a control device used for controlling power generation based on rotation speed of the on-vehicle power generator has been known.

Particularly, the control device of the on-vehicle power generator detects rotation speed based on alternating current voltage appearing in a stator winding. When the detected rotation speed exceeds a reference rotation speed, the control device allows the on-vehicle power generator to start power generation. When the detected rotation speed becomes lower than the reference rotation speed, the on-vehicle power generator stops power generation. When the reference rotation speed is set to a value that is too small, erroneous detection may occur in response to noise and the like. Therefore, the reference rotation speed is preferably set to a value that is large to a certain extent. During low-temperature startup in winter, in particular, when ambient temperature is low, operation is started at a higher rotation than in other seasons. Therefore, the reference rotation speed can be set to a high value. However, when the reference rotation speed is set to a value higher than the idling rotation speed after the end of a warm-up operation of the engine, an issue occurs in that power generation cannot be continued during idling, such as when waiting for a traffic signal to change.

To avoid such issues, for example, Japanese Patent No. 4006941 discloses an on-vehicle power generation control device that performs control to start power generation when a phase voltage of a stator winding exceeds a first reference frequency, and to stop power generation when the phase voltage becomes lower than a second frequency that is lower than the first reference frequency.

During low-temperature startup, even when the rotation pulse of the engine due to ignition is large and the actual rotation speed (average rotation speed) is low, the on-vehicle power generation control device disclosed in Japanese Patent No. 4006941 may start power generation when a high rotation portion of the pulse becomes higher than the first reference frequency. Once power generation is started, power generation torque is applied regardless of the actual engine rotation being low. Therefore, although engine rotation once again drops below the rotation speed equivalent to the first reference frequency before sufficiently increasing, power generation torque is sustained because power generation is not stopped. As a result, engine startup is delayed. A problem occurs in that startability deteriorates. The deterioration in startability also causes engine stalling. Therefore, improvement is desired.

SUMMARY

An embodiment provides a vehicle power generation control device capable of improving engine startability is actualized by a simplified configuration.

As an aspect of the embodiment, a device for controlling power generation of a power generator mounted on a vehicle includes: switching means connected to a field winding of the power generator, for switching current flowing through the field winding to be ON and OFF; voltage control means for controlling the switching means to supply an excitation current to the power generator, in which the voltage control means controls the switching means to gradually increase the excitation current when the excitation current is increasing whereby the voltage control means maintains an output voltage of the power generator to be a predetermined value; detecting means for detecting a startup state indicating an engine startup and for detecting normal state when the startup state is terminated; startup control means for controlling the voltage control means when the startup state is detected by the detecting means, the startup control means controlling voltage control means to start power generation when a frequency of a phase voltage appears at a stator winding of the power generator exceeds a first reference frequency, and controlling the voltage control means to stop power generation when the frequency of the phase voltage is lower than the first reference frequency; and normal state control means for controlling the voltage control means when the normal state is detected by the detecting means, the normal state control means controlling the voltage control means to continue power generation while the frequency of the phase voltage exceeds the first reference frequency, and to stop power generation when the frequency of the phase voltage is lower than a second reference frequency that is lower than the first reference frequency.

During low-temperature start up and the like, even when the engine rotation speed is increased to a certain extent and power generation is started, combustion is unstable. Therefore, the engine rotation speed may decrease again in accompaniment with increase in power generation torque. However, the power generation torque that acts as engine load can be decreased by power generation being promptly stopped when the engine rotation speed decreases. Therefore, engine startability, particularly engine startability during low-temperature startup, can be improved.

In addition, the above-described detecting means preferably judges the end of the startup state when the ON-duty cycle of the switching means becomes 100% or when the output voltage of the vehicle power generator becomes higher than a regulated voltage. The ON-duty cycle of the switching means and the output voltage of the power generator are detected during normal power generation control (i.e., normal state). Therefore, when these values are used to judge the end of the startup state, a special additional configuration for judging the end of the startup state is not required. The configuration can be simplified.

In addition, the detecting means preferably judges the end of the startup state when a state in which the frequency of the phase voltage of the stator winding exceeds the first reference frequency continues over a predetermined amount of time. The end of the startup state can be judged simply by addition of a configuration, such as a timer, required for measuring the predetermined amount of time. Therefore, the configuration can be simplified.

Furthermore, the above-described voltage control means includes signal generating means for generating a pulse width modulation signal for controlling the switching means. The signal generating means preferably generates, after the end of the startup state, a pulse width modulation signal of which the duty gradually increases when the regulated voltage is higher than the output voltage of the vehicle power generator and gradually decreases when the regulated voltage is lower than the output voltage. The signal generating means preferably generates, in the startup state, a pulse width modulation signal of which the duty gradually increases until the end of the startup state and becomes a duty equivalent to initial excitation when the frequency of the phase voltage of the stator winding becomes the first reference frequency or lower. Power generation control is performed such that the duty of the pulse width modulation signal returns to the duty equivalent to initial excitation and gradually increases when power generation is stopped and restarted in the startup state. Therefore, when power generation is repeatedly started and stopped with the first reference frequency as a parameter, engine startability can be improved by the power generator torque at the start of power generation being reduced.

DETAILED DESCRIPTION OF THE PREFERRED EMBODIMENTS

Figure 1:
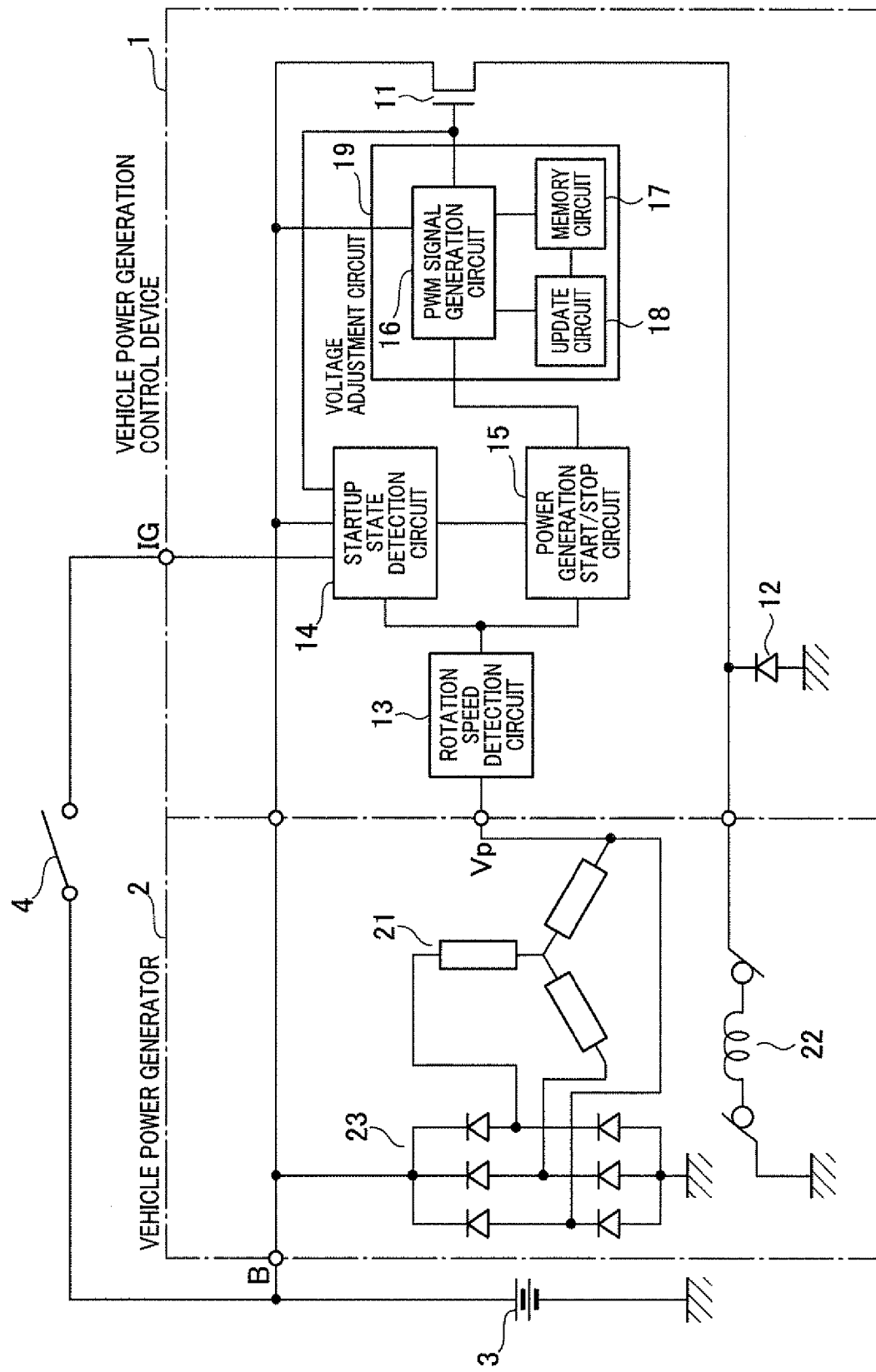
FIG. 1 is a diagram of a configuration of a vehicle power generation control device according to an embodiment.

An embodiment of a vehicle power generation control device to which the present invention is applied will hereinafter be described with reference to the drawings. FIG. 1 is a diagram of a configuration of the vehicle power generation control device according to the embodiment. FIG. 1 also shows a state of connection of the vehicle power generation control device with a vehicle power generator and a battery.

A vehicle power generation control device 1 in FIG. 1 performs control to keep an output voltage VB of a vehicle power generator 2 at a predetermined value (regulated voltage). The vehicle power generator 2 includes a three-phase stator winding 21, a field winding 22, and a full-wave rectification circuit 23. The stator winding 21 is included in a stator. The field winding 22 is provided in a rotor and magnetizes a field pole. The full-wave rectification circuit 23 performs full-wave rectification of the three-phase output from the stator winding 21. Control of the output voltage VB of the vehicle power generator 2 is performed by field current sent to the field winding 22 being intermittently adjusted. An output terminal (B terminal) of the vehicle power generator 2 is connected to a battery 3 and other electrical loads (not shown). The vehicle power generator 2 supplies power to the connected battery 3 and electrical loads.

Next, a detailed configuration of the vehicle power generation control device 1 will be described. As shown in FIG. 1, the vehicle power generation control device 1 includes a metal-oxide-semiconductor field-effect transistor (MOSFET) 11, a free-wheeling diode 12, a rotation speed detection circuit 13, a startup state detection circuit 14, a power generation start/stop circuit 15, and a voltage adjustment circuit 19.

The MOSFET 11 is connected in series to the field winding 22. The MOSFET 11 intermittently supplies excitation current to the field winding 22. The free-wheeling diode 12 is connected in parallel to the field winding 22. When the MOSFET 11 is turned OFF, the free-wheeling diode 12 circulates the current flowing to the field winding 22.

The rotation speed detection circuit 13 detects the frequency of a phase voltage indicating the rotation speed of the vehicle power generator 2 based on any phase voltage (such as a Y-phase voltage Vp) of the stator winding 21. The startup state detection circuit 14 detects a predetermined period corresponding to engine startup as a startup state.

The power generation start/stop circuit 15 performs control, in the startup state, to start power generation of the vehicle power generator 2 under the control of the voltage adjustment circuit 19 when the frequency detected by the rotation speed detection circuit 13 exceeds a first reference frequency. The power generation start/stop circuit 15 also stops power generation of the vehicle power generator 2 under the control of the voltage adjustment circuit 19 when the detected frequency becomes lower than the first reference frequency. In a state other than the startup state, the power generation start/stop circuit 15 performs control to continue power generation of the vehicle power generator 2 under the control of the voltage adjustment circuit 19 when the frequency detected by the rotation speed detection circuit 13 exceeds the first reference frequency. The power generation start/stop circuit 15 also stops power generation of the vehicle power generator 2 under the control of the voltage adjustment circuit 19 when the detected frequency becomes lower than a second reference frequency that is lower than the first reference frequency.

The voltage adjustment circuit 19 supplies excitation current to the field winding 22. The voltage adjustment circuit 19 also controls the MOSFET 11 such that the excitation current increases gradually when increasing, thereby keeping the output voltage VB of the vehicle power generator 2 at the regulated voltage. The voltage adjustment circuit 19 includes a pulse width modulation (PWM) signal generation circuit 16, a memory circuit 17, and an update circuit 18.

The PWM signal generation circuit 16 compares the output voltage VB of the vehicle power generator 2 and the regulated voltage. The PWM signal generation circuit 16 then generates a PWM signal having a duty based on the amount of deviation. The memory circuit 17 stores a value related to the above-described amount of deviation (gradual excitation stored duty). The update circuit 18 periodically and gradually changes the stored value stored in the memory circuit 17 to approach the above-described amount of deviation. The update circuit 18 also updates the stored content of the memory circuit 17 with the changed stored value as the new stored value. The duty of the PWM signal generated by the PWM signal generation circuit 16 (referred to as a "drive duty F-duty") is determined based on the stored value (gradual excitation stored duty).

The above-described MOSFET 11 corresponds with a switching means. The voltage adjustment circuit 19 corresponds with voltage control means. The startup state detection circuit 14 corresponds with detecting means. The power generation start/stop circuit 15 corresponds with startup control means and normal state control means. The PWM signal generation circuit 16 corresponds with signal generating means.

Figure 2:
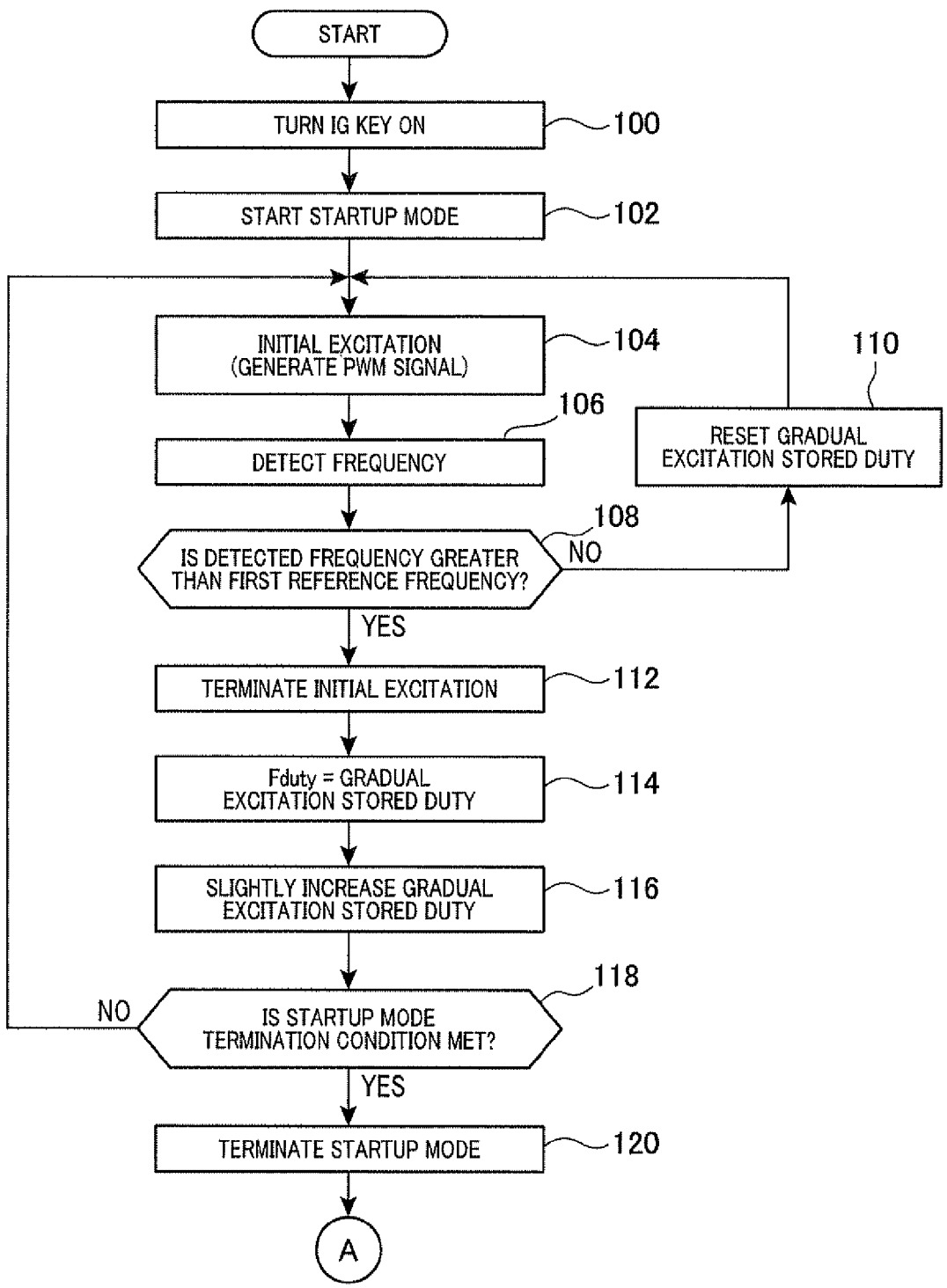
FIG. 2 is a flowchart of operation procedures for power generation control performed by the vehicle power generation control device.
Figure 3:
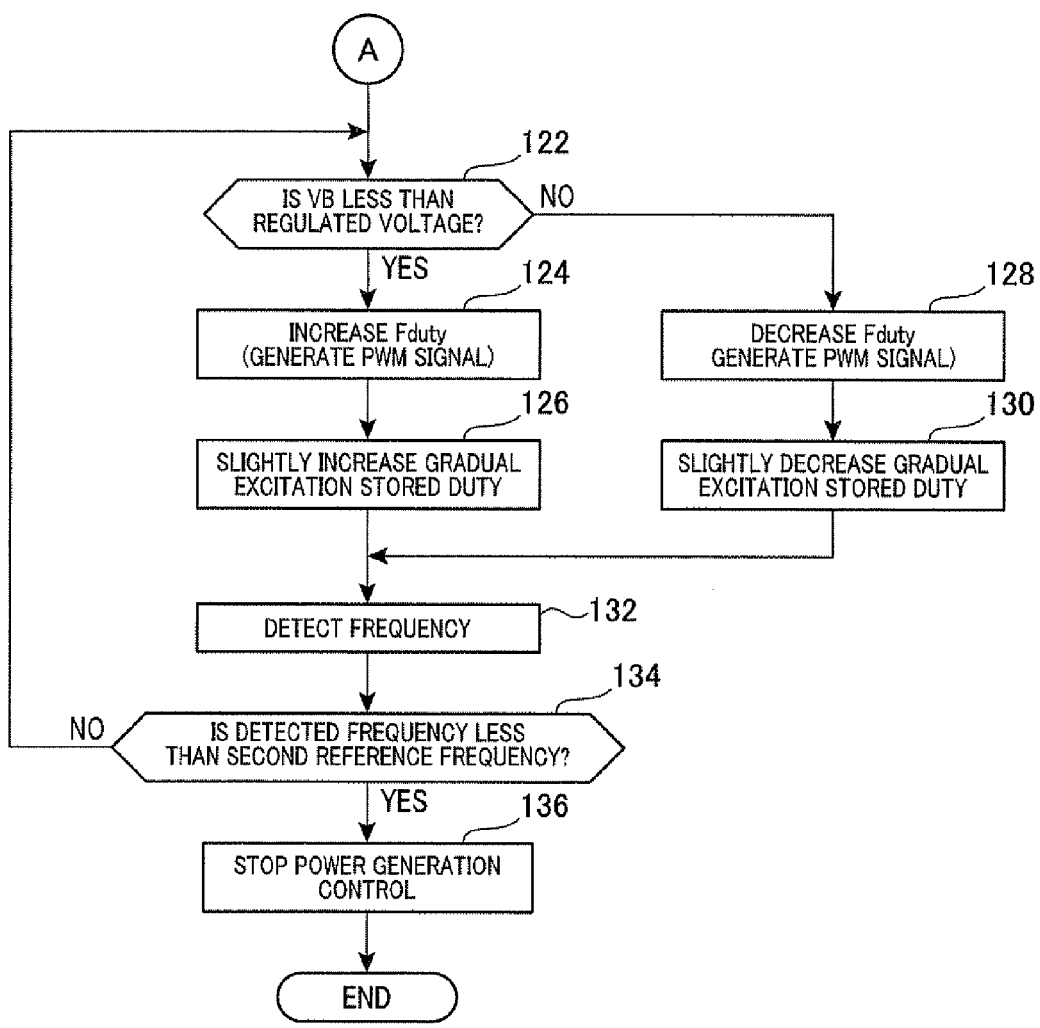
FIG. 3 is a flowchart of operation procedures for power generation control performed by the vehicle power generation control device.

The vehicle power generation control device 1 according to the embodiment is configured as described above. Next, operations of the vehicle power generation control device 1 will be described. FIG. 2 and FIG. 3 are flowcharts of operation procedures for power generation control performed by the vehicle power generation control device 1.

When an ignition key 4 is turned ON (Step 100), the startup state detection circuit 14 detects the start of an operation mode corresponding to the startup state (referred to as "startup mode") (Step 102). Then, the PWM signal generation circuit 16 within the voltage adjustment circuit 19 generates a PWM signal having a predetermined ON-duty cycle to start initial excitation (Step 104). The state in which the PWM signal equivalent to the initial excitation is generated corresponds with a "power generation stopped" state.

Next, the rotation speed detection circuit 13 detects the frequency of the Y-phase voltage Vp equivalent to the rotation speed of the vehicle power generator 2 based on the Y-phase voltage Vp (Step 106). The PWM signal generation circuit 16 judges whether or not the detected frequency exceeds the first reference frequency (Step 108). The PWM signal generation circuit 16 judges NO when the detected frequency is the first reference frequency or lower. The update circuit 18 within the voltage adjustment circuit 19 resets the gradual excitation stored duty stored in the memory circuit 17 (Step 110). Operations subsequent to PWM signal generation corresponding to the initial excitation at Step 104 are performed. For example, the ON-duty cycle corresponding to the initial excitation state is set as the value after reset of the gradual excitation stored duty.

When the detected frequency exceeds the first reference frequency, the PWM signal generation circuit 16 judges YES at Step 108. In this instance, the power generation start/stop circuit 15 decides to terminate the initial excitation state (Step 112). The PWM signal generation circuit 16 generates a PWM signal of which the drive duty F-duty is the gradual excitation stored duty stored in the memory circuit 117 at this time (Step 114). The update circuit 18 then updates the stored content of the memory circuit 17 with a value obtained by a predetermined amount of increase being added to the gradual excitation stored duty stored in the memory circuit 17 as the new gradual excitation stored duty (Step 116).

Next, the startup state detection circuit 14 judges whether or not a termination condition for the startup mode is met (Step 118). For example, the following two conditions (termination conditions A and B) can be considered as the termination condition.

(Termination Condition A)

The termination condition A is as follows: when the drive duty F-duty that is the ON-duty cycle of the MOSFET 11 increases and becomes 100%; or when the output voltage VB of the vehicle power generator 1 becomes higher than the regulated voltage. In other words, the startup state detection circuit 14 judges that the termination condition has been met when the drive duty F-duty is 100% at Step 114 or when the output voltage VB is higher than the regulated voltage at the end of the operation at Step 116. The startup state detection circuit 14 judges that the termination condition has not been met in other instances.

(Termination Condition B)

The termination condition B is as follows: when the state in which the frequency of the phase voltage Vp exceeds the first reference frequency continues for over a predetermined amount of time. In other words, the startup state detection circuit 14 measures the amount of time for which the state in which the YES judgment is made at Step 108 (the detected frequency is higher than the first reference frequency) has continued. When the state has continued for a predetermined amount of time, the startup state detection circuit 14 judges that the termination condition has been met. The startup state detection circuit 14 judges that the termination condition has not been met in other instances.

Only one of the two termination conditions A and B may be used. Alternatively, both termination conditions A and B may be used. When both termination conditions A and B are used, the startup state detection circuit 14 judges YES at Step 118 when at least one of the termination conditions A and B is met.

When the termination condition is not met, the startup state detection circuit 14 judges NO at Step 118. The operations subsequent to PWM signal generation corresponding to the initial excitation at Step 104 are performed. On the other hand, when the termination condition is met, the startup state detection circuit 14 judges YES at Step 118. The startup mode is then terminated (Step 120). Subsequently, the operation mode transitions to normal power generation mode (i.e., normal state).

After the operation mode transitions to normal power generation mode, the PWM signal generation circuit 16 judges whether or not the output voltage VB of the vehicle power generator 2 is lower than the regulated voltage (Step 122). When the output voltage VB is lower than the regulated voltage, the PWM signal generation circuit 16 judges YES. The PWM signal generation circuit 16 sets a drive duty F-duty obtained by the previous drive duty F-duty being increased by a predetermined amount of increase, and generates the PWM signal having the drive duty F-duty (Step 124). The drive duty F-duty that has been obtained by being increased by the predetermined amount of increase is set so as not to exceed the gradual excitation stored duty stored in the memory circuit 17 at this time. The update circuit 18 then updates the stored content of the memory circuit 17 with the value obtained by the gradual excitation stored duty stored in the memory circuit 17 being increased by the predetermined amount of increase as the new gradual excitation stored duty (Step 126).

On the other hand, when the output voltage VB is the regulated voltage or more, the PWM signal generation circuit 16 judges NO at Step 122. The PWM signal generation circuit 16 sets a drive duty F-duty obtained by the previous drive duty F-duty being decreased by a predetermined amount of decrease, and generates the PWM signal having the drive duty F-duty (Step 128). The update circuit 18 then updates the stored content of the memory circuit 17 with the value obtained by the gradual excitation stored duty stored in the memory circuit 17 being decreased by the predetermined amount of decrease as the new gradual excitation stored duty (Step 130).

After update of the gradual excitation stored duty at Step 126 or Step 130 is completed, the rotation speed detection circuit 13 detects the frequency of the Y-phase voltage Vp (Step 132). The power generation start/stop circuit 15 judges whether or not the detected frequency is lower than the second reference frequency (less than the first reference frequency) (Step 134). When the detected frequency is the second reference frequency or more, the power generation start/stop circuit 15 judges NO. Operations subsequent to comparison judgment of the output voltage VB and the regulated voltage at Step 122 are repeatedly performed. On the other hand, when the detected frequency is lower than the second reference frequency, the power generation start/stop circuit 15 judges YES at Step 134. The power generation start/stop circuit 15 stops the power generation control in normal power generation mode performed by the voltage adjustment circuit 19 (Step 136). As a result, the series of power generation control operations in startup mode and normal power generation mode are completed.

Figure 4:
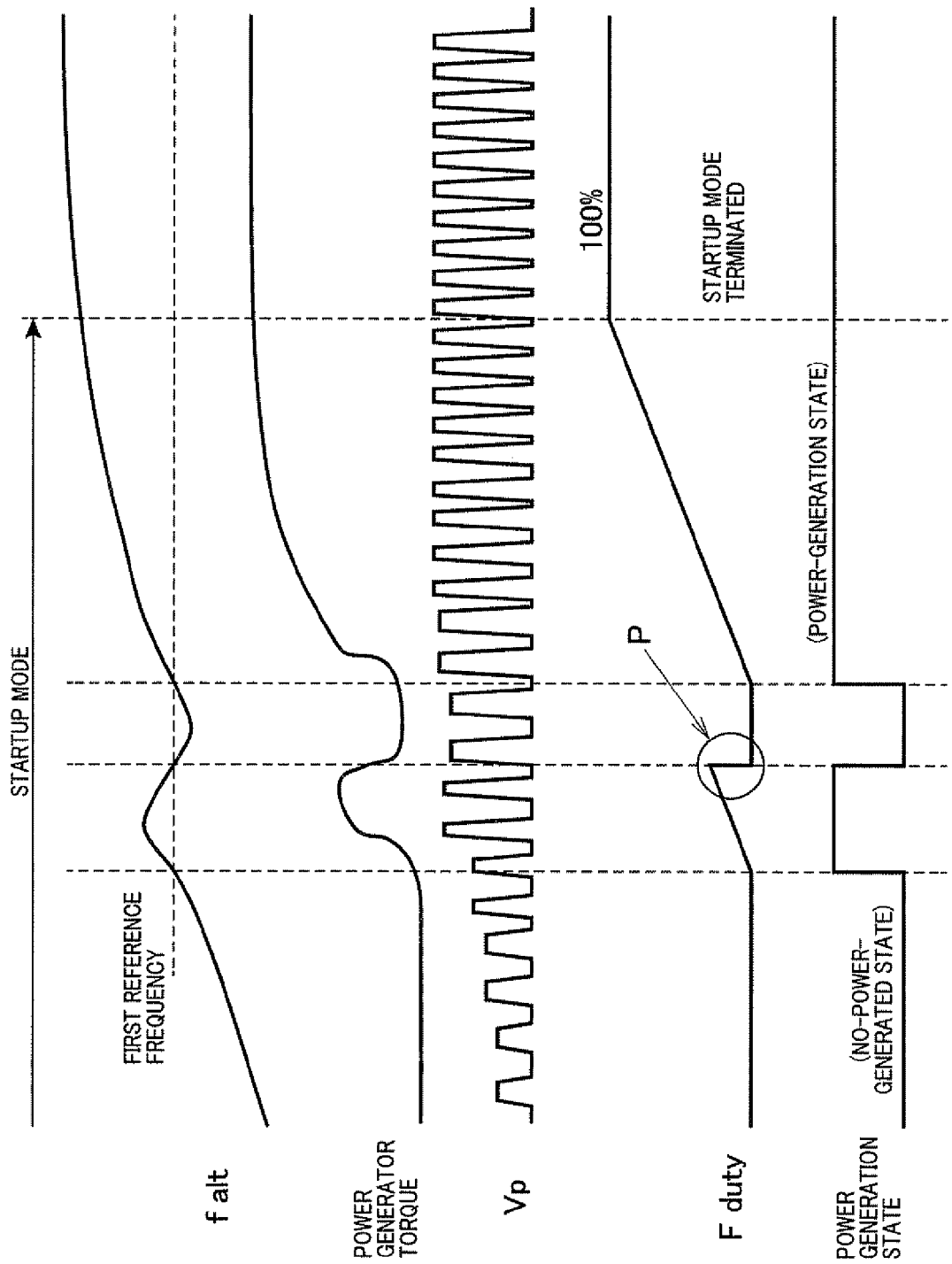
FIG. 4 is a waveform diagram of changes in power generation state in startup mode.

FIG. 4 is a waveform diagram showing the changes in power generation state in startup mode. In FIG. 4, "f-alt" indicates the frequency of the Y-phase voltage Vp detected by the rotation speed detection circuit 13. "Power generator torque" indicates the power generation torque of the vehicle power generator 2. As shown in FIG. 4, in startup mode, when the detected frequency f-alt is the first reference frequency or lower, initial excitation is performed and the power generation state is a no-power-generated state. When the detected frequency f-alt temporarily exceeds the first reference frequency, the power generation state transitions to a power-generated state. The drive duty F-duty gradually increases from the initial excitation state. The power generator torque also increases in accompaniment with the increase in drive duty F-duty. Therefore, when the engine rotation speed decreases and the detected frequency f-alt becomes the first reference frequency or lower, the power generation state returns from the power-generated state to the no-power-generated state. In this way, until the drive duty F-duty reaches 100% and the startup mode ends (the end of the startup mode may be determined based on the other termination conditions A and B), the power generation state returns to the no-power-generated state when the detected frequency f-alt becomes the first reference frequency or lower. Therefore, decrease in engine rotation can be minimized.

In this way, in the vehicle power generation control device 1 according to the present embodiment, the power generation torque that acts as engine load can be reduced by power generation being promptly stopped when the engine rotation speed decreases in startup mode. Therefore, engine startability, particularly engine startability during low-temperature startup, can be improved.

In addition, when the termination condition for startup mode is "when the drive duty F-duty that is the ON-duty cycle of the MOSFET 11 increases and becomes 100%; or when the output voltage VB of the vehicle power generator 1 becomes higher than the regulated voltage", a special additional configuration is not required for judging the end of startup mode. The configuration can be simplified.

In addition, when the termination condition for startup mode is "when the state in which the frequency of the phase voltage Vp exceeds the first reference frequency continues for over a predetermined amount of time", the end of the startup state can be judged simply by addition of a configuration, such as a counter, for measuring the predetermined amount of time. Therefore, the configuration can be simplified.

In addition, when power generation is stopped and restarted in startup mode, power generation control is performed such that the duty (drive duty F-duty) of the PWM signal returns to the duty equivalent to initial excitation and gradually increases (see P in FIG. 4). Therefore, when power generation is repeatedly started and stopped with the first reference frequency as a parameter, engine startability can be improved by the power generator torque at the start of power generation being reduced.

As described above, in the present invention, the power generation torque that acts as engine load can be reduced by power generation being promptly stopped when the engine rotation speed decreases during low-temperature startup and the like. Therefore, engine startability, particularly engine startability during low-temperature startup, can be improved.

What is claimed is:

1. A device for controlling power generation of a power generator mounted on a vehicle, the device comprising:
   switching means connected to a field winding of the power generator, for switching current flowing through the field winding to be ON and OFF;
   voltage control means for controlling the switching means to supply an excitation current to the power generator, wherein the voltage control means controls the switching means to gradually increase the excitation current when the excitation current is increasing whereby the voltage control means maintains an output voltage of the power generator to be a predetermined value;
   detecting means for detecting a startup state indicating an engine startup and for detecting normal state when the startup state is terminated;
   startup control means for controlling the voltage control means when the startup state is detected by the detecting means, the startup control means controlling voltage control means to start power generation when a frequency of a phase voltage appears at a stator winding of the power generator exceeds a first reference frequency, and controlling the voltage control means to stop power generation when the frequency of the phase voltage is lower than the first reference frequency; and
   normal state control means for controlling the voltage control means when the normal state is detected by the detecting means, the normal state control means controlling the voltage control means to continue power generation while the frequency of the phase voltage exceeds the first reference frequency, and to stop power generation when the frequency of the phase voltage is lower than a second reference frequency that is lower than the first reference frequency.

2. The device according to claim 1, wherein the detecting means is configured to detect termination of the startup state when ON-duty cycle of the switching means becomes 100% or when the output voltage of the power generator becomes higher than a regulated voltage thereby detecting the normal state.

3. The device according to claim 1, wherein the detecting means is configured to detect termination of the startup state when the frequency of the phase voltage continues to exceeds the first reference frequency for more than a predetermined amount of time.

4. The device according to claim 1, wherein the voltage control means includes signal generating means for generating a pulse width modulation signal to control the switching means,
   the signal generating means generates, after the normal state is detected, the pulse width modulation signal of which the duty gradually increases when the regulated voltage is higher than the output voltage of the power generator and gradually decreases when the regulated voltage is lower than the output voltage, and
   the signal generating means generates, while the startup state is detected, a pulse width modulation signal of which the duty gradually increases until the end of the startup state and becomes a duty equivalent to initial excitation when the frequency of the phase voltage becomes the first reference frequency or lower.

* * * * *